US008818832B2

(12) United States Patent
Goyal et al.

(10) Patent No.: US 8,818,832 B2
(45) Date of Patent: Aug. 26, 2014

(54) DECISION SUPPORT SYSTEM AND METHOD FOR DISTRIBUTED DECISION MAKING FOR OPTIMAL HUMAN RESOURCE DEPLOYMENT

(75) Inventors: Munish Goyal, Panchkula (IN); Nandakishore Kambhatla, Bangalore (IN); Pavithra Krishnan, Bangalore (IN); Shivaram Kulkarni, Bangalore (IN); Rohit Manohar Lotlikar, Bangalore (IN); Debapriyo Majumdar, Kolkata (IN); Gyana Parija, Gurgaon (IN); Sambuddha Roy, New Delhi (IN); Soujanya Soni, New Delhi (IN); Simon Thomas, Rochester, NY (US); Milind V. Vaidya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 12/609,851

(22) Filed: Oct. 30, 2009

(65) Prior Publication Data
US 2011/0106711 A1  May 5, 2011

(51) Int. Cl.
G06Q 10/00  (2012.01)
G06Q 10/06  (2012.01)

(52) U.S. Cl.
CPC .............................. *G06Q 10/063112* (2013.01)
USPC ......................................... 705/7.14; 705/321

(58) Field of Classification Search
CPC ................... G06Q 10/1053; G06Q 10/063112
USPC ................................................. 705/7.14, 321
See application file for complete search history.

(56) References Cited

U.S. PATENT DOCUMENTS

| 5,164,897 | A | * | 11/1992 | Clark et al. | 705/321 |
|---|---|---|---|---|---|
| 6,272,467 | B1 | * | 8/2001 | Durand et al. | 705/5 |
| 6,430,562 | B1 | | 8/2002 | Kardos et al. | |
| 6,574,605 | B1 | | 6/2003 | Sanders et al. | |
| 6,694,329 | B2 | | 2/2004 | Murray | |
| 7,457,764 | B1 | * | 11/2008 | Bullock et al. | 705/7.14 |
| 2002/0198766 | A1 | * | 12/2002 | Magrino et al. | 705/11 |
| 2004/0030566 | A1 | | 2/2004 | Brooks Rix | |
| 2004/0068432 | A1 | | 4/2004 | Meyerkopf et al. | |
| 2004/0162753 | A1 | | 8/2004 | Vogel et al. | |
| 2005/0004825 | A1 | | 1/2005 | Ehrler et al. | |
| 2006/0229896 | A1 | * | 10/2006 | Rosen et al. | 705/1 |

(Continued)

FOREIGN PATENT DOCUMENTS

WO 02082335 10/2002

OTHER PUBLICATIONS

Richter, Yossi; Naveh, Yehuda; Gresh, Donna L.; Connors, Daniel P.; , "Optimatch: Applying Constraint Programming to Workforce Management of Highly-skilled Employees," Service Operations and Logistics, and Informatics, 2007. SOLI 2007. IEEE International Conference on , vol., No., pp. 1-6, Aug. 27-29, 2007.*

(Continued)

*Primary Examiner* — Lynda C Jasmin
*Assistant Examiner* — Timothy Padot
(74) *Attorney, Agent, or Firm* — Ference & Associates LLC

(57) ABSTRACT

A decision support tool which takes a high-level view of supply and demand in the realm of labor resources and produces globally-optimal recommendations for assignment of practitioners to open seats. These assignments preferably optimize a utility function composed of different business metrics and can be customizable for different organizations and priorities.

25 Claims, 7 Drawing Sheets

(56) References Cited

U.S. PATENT DOCUMENTS

| | | |
|---|---|---|
| 2007/0038505 A1 | 2/2007 | Barnes, IV et al. |
| 2007/0219837 A1 | 9/2007 | Lu et al. |
| 2009/0006164 A1 | 1/2009 | Kaiser et al. |

OTHER PUBLICATIONS

Naveh, Y.; Richter, Y.; Altshuler, Y.; Gresh, D. L.; Connors, D. P.; , "Workforce optimization: Identification and assignment of professional workers using constraint programming," IBM Journal of Research and Development , vol. 51, No. 3.4, pp. 263-279, May 2007.*

T. A. Lasko and S. E. Hauser. Approximate string matching algorithms for limited-vocabulary OCR output correction. In Proceedings of SPIE, vol. 4307, Document Recognition and Retrieval VIII, pp. 232-240, 2001.*

Yoshimura, M., Fujimi, Y., Izui, K., and Nishiwaki, S., "Decision-making support system for human resource allocation in product development projects", International Journal of Production Research, vol. 44, No. 5, Mar. 1, 2006, 831-848.

Certa, A., Enea, M., Galante, G., and Fata, C., Multi-Skilled Human Resources Allocation in R&D Projects, MITIP2006, Sep. 11-12, Budapest.

Dixit, K., Goyal, M., Gupta, P., Kambhatla, N., Lotikar, R., Majumdar, D., Parija, G., Roy, S., and Soni, S., "Effective Decision Support for Workforce Deployment Service Systems", IBM India Research Laboratory, New Delhi and Bangalore, India.

Dong, Jin, et al., "iRDM: A Solution for Workplace Supply Chain Management in an Outsourcing Environment", IEEE International Conference on Operations, Logistics, and Informatics, Oct. 12-15, 2008, pp. 2498-2501, vol. 2, IEEE, Beijing, China.

Naveh, Y., "Workforce optimization: Identification and assignment of professional workers using constraint programming", IBM Journal of Research & Development, May/Jul. 2007, pp. 263-279, vol. 51, No. 3/4, International Business Machines Corporation, USA.

Ward, Joe. H., et al., "The Ultimate Person-Job Match: A Key to Future Worker Productivity", Ergometricka-A Journal of Work Measurement Research, 2000. pp. 45-50, vol. 1, No. 1, available online at http://www.ergometrika.org/volume1.htm, as of Jan. 11, 2012.

Yoshimura, M., et al., "Decision-making support system for human resource allocation in product development projects", International Journal of Production Research, Mar. 1. 2006, pp. 831-848, vol. 44, No. 5, Taylor & Francis, United Kingdom.

* cited by examiner

Seat / Job Description

| ID:AB7XSK | Database Developer |
|---|---|
| Status: | 1 day *remaining* |
| Start Date: | 01 Jan 2009 |
| End Date: | 31 Dec 2009 |
| Seat Fulfillment | John Smith |
| Manager: | |
| Location: | New York |
| Sector: | Financial |
| Required Skills: | Databases, Oracle PL/SQL |

— 303

Matched Practitioners

*Found 18 matches.*

☐ Location must match ☐ Order by Availability Date ☐ Primary skills must match — 309

1. Lilly Gordon | Available from: 06 Jan 2009 | Available in 6 days

Serial: 070217 | Location: New York | Sector: Industrial | Manager: Graham Richards
Skills: Developer - Oracle Applications
Additional skills: C++, Perl
*Resume: Develop Oracle... Oracle Tools SQL+ Cons ... SQL Technology to Develop Applications ... Use ORACLE ORACLE DB Technology to Develop Appls . Implement Oracle Dev Tools PL ... Perform Application Developer ...*
[Full Resume] [Contact Details]

Cross matches
Also matches 6 other seats
See all seats matched with this practitioner

2. Amit Singh | Available from: 26 Dec 2008 | On Bench for 6 days

Serial: 097203 | Base-City: New York | Sector: Industrial | Manager: Jenny Samson
Skills: Developer - C++
Additional skills: Databases - Oracle
*Resume: ... in banking software development using RDBMS such as Oracle 9i, plsql, MS T SQL PL/SQL Stored Procedures ... interest calculation application for loans and ... India This application is used for ... As a Developer Harshvardhan was involve ... T SQL PL/SQL Stored Procedures...*
Also Being considered for seat B98JHJ
[Full Resume] [Contact Details]

Cross matches
Also matches 15 other seats
See all seats matched with this practitioner

Fig. 4

DECISION SUPPORT SYSTEM AND METHOD FOR DISTRIBUTED DECISION MAKING FOR OPTIMAL HUMAN RESOURCE DEPLOYMENT

BACKGROUND

Currently, many labor-intensive businesses have up-to-the-minute staffing needs, wherein staff are typically drawn from a "bench" or "pool" responsive to dynamically varying demand. Such businesses include, but are by no means limited to, business-to-business services such as traditional consulting, design, technical support (typically for products), call center operations, IT implementation and IT outsourcing. Different workers of course will present different characteristics (e.g., skill level in one or more disciplines) as well as different schedules of availability. Accordingly, service providers typically encounter great difficulty in optimally matching "bench" workers with businesses demanding their services, especially in a manner that is time- and cost-efficient.

BRIEF SUMMARY

Broadly contemplated herein, in accordance with at least one presently preferred embodiment of the present invention, is a decision support tool which takes a high-level view of supply and demand in the realm of labor resources and produces globally-optimal recommendations for assignments of practitioners to open seats. These assignments preferably optimize a utility function composed of different business metrics and can be customizable for different organizations and priorities.

In summary, one aspect of the invention provides a system comprising: a decision support tool comprising one or more processors and one or more modules executable by the one or more processors, the one or more modules comprising: computer code configured to assimilate open seat data and practitioner data; computer code configured to transform the open seat data and practitioner data into seat attributes and practitioner attributes; computer code configured to assess viability of matching practitioners with seats based on predetermined matching criteria; computer code configured determine preferred matches based on assessed viability; and computer code configured to deliver the preferred matches to a user interface.

Another aspect of the invention provides a system comprising: a user interface comprising one or more processors and one or more modules executable by the one or more processors, the one or more modules comprising: computer code configured to receive data relating to preferred matches of practitioners and open seats; and computer code configured to display at least one optimal match corresponding to a practitioner and a seat and, adjacent thereto, cross-match information corresponding to at least one other viable seat corresponding to a practitioner.

A further aspect of the invention provides a method comprising: assimilating open seat data and practitioner data; transforming the open seat data and practitioner data into seat attributes and practitioner attributes; assessing viability of matching practitioners with seats based on predetermined matching criteria; determining preferred matches based on said assessing; and delivering the preferred matches to a user interface.

An additional aspect of the invention provides a method comprising: receiving data relating to preferred matches of practitioners and open seats; and displaying at least one optimal match corresponding to a practitioner and a seat and, adjacent thereto, cross-match information corresponding to at least one other viable seat corresponding to a practitioner.

Yet a further aspect of the invention provides a A computer program product comprising: a computer readable storage medium having computer readable program code embodied therewith, the computer readable program code comprising: computer code configured to assimilate open seat data and practitioner data; computer code configured to transform the open seat data and practitioner data into seat attributes and practitioner attributes; computer code configured to assess viability of matching practitioners with seats based on predetermined matching criteria; computer code configured determine preferred matches based on assessed viability; and computer code configured to deliver the preferred matches to a user interface.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4 illustrates components of a user interface.

DETAILED DESCRIPTION

Figure 1:
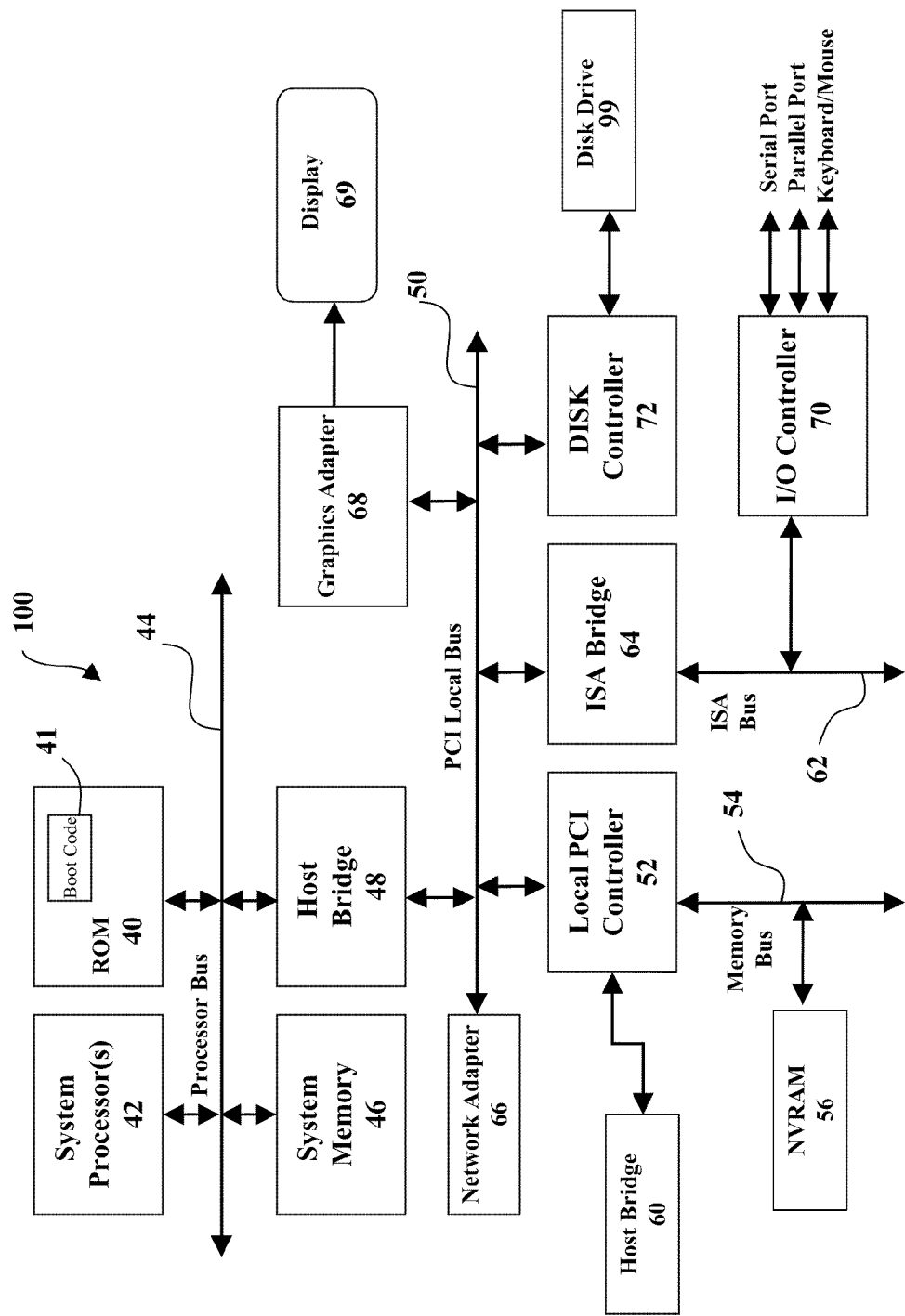
FIG. 1 illustrates a computer system.

It will be readily understood that the components of the embodiments of the invention, as generally described and illustrated in the figures herein, may be arranged and designed in a wide variety of different configurations in addition to the described presently preferred embodiments. Thus, the following more detailed description of the embodiments of the invention, as represented in the figures, is not intended to limit the scope of the embodiments of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings/figures. The following description is intended only by way of example and simply illustrates certain selected presently preferred embodiments of the invention as claimed herein.

Regarding the figures, the flowchart and block diagrams in the figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description now turns to the figures and select, presently preferred embodiments of the invention will be described. The following description of various embodiments of the invention is presented to highlight certain aspects of the invention, and the scope of the claimed embodiments of the invention will be pointed out in the appended claims.

Referring now to FIG. 1, there is depicted a block diagram of an illustrative embodiment of a computer system 100. The illustrative embodiment depicted in FIG. 1 may represent a device such as a game console, a set top box, a mobile device, a laptop, or a desktop or workstation computer. As is apparent from the description, however, embodiments of the invention may be implemented in any appropriately configured device or computing system, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to a LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, serial and parallel ports, etc. A disk controller 72 connects a disk drive 99 with PCI local bus 50. The USB Bus and USB Controller (not shown) are part of the Local PCI controller (52).

Figure 2:
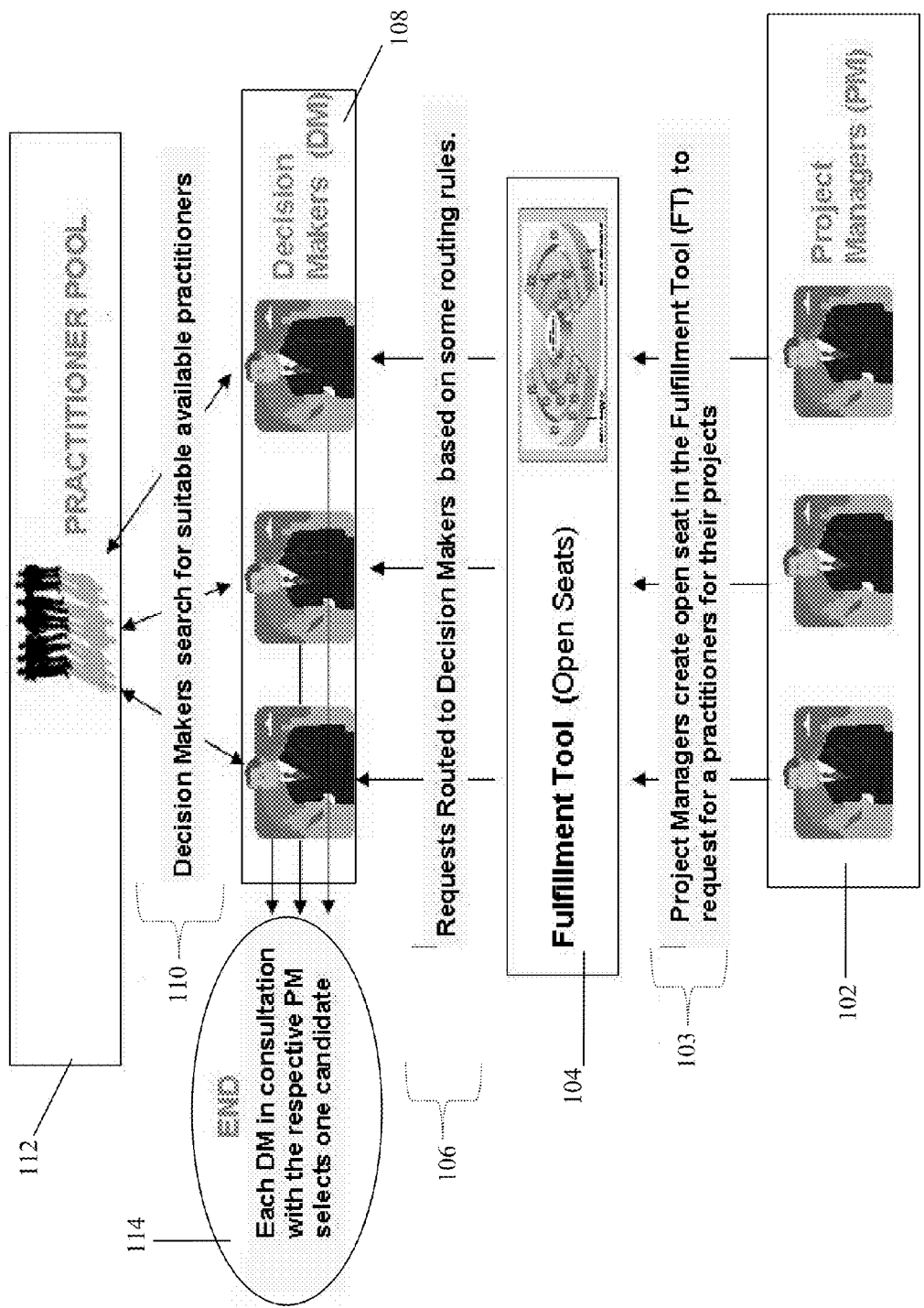
FIG. 2 schematically illustrates a context of conventional resource allocation.

One significant, though hardly limiting, example of human resource deployment issues that can be contemplated herein is the case of global IT service delivery organizations. Typically, a resource management unit will assume responsibility for such allocation and deployment. FIG. 2 schematically provides an overview of a problem to be addressed in such a context.

Essentially, the problem involves "demand" being created by clients to fulfill professional resource requirements for their ongoing or pipelined projects and is typically influenced by corporate and government budget cycles.

As shown, project managers 102 normally create (103) an open seat in a "fulfillment tool" 104 by way of requesting one or more practitioners for a project. Requests are routed (106) to decision makers (108), and the decision makers 108 search (110) for suitable available practitioners in a practitioner pool 112. Finally, each decision maker (DM) will typically select (114) a candidate in consultation with a project manager (102).

More particularly, service providers typically maintain a resource pool, i.e., a set of professional resources (e.g., practitioners) 112, who are either assigned to clients' projects or available for assignments at any given point of time. The demand is typically in the form of an "open seat" 104 wherein various attributes of the demand are typically specified; such attributes may include, but of course are not limited to, a start date, end date, professional skills needed and any required work locations. Each open seat may further require multiple resources specified by the number of open positions against the open seat. The duration of a typical open seat may of course vary, e.g., conceivably from a few months to a year.

The efficient allocation of professional resources, of course, can be elusive in the face of many unavoidable practical realities. For instance, there may be a gap of several days between a practitioner's assignment end date and the start of his/her next assignment, during which the practitioner is idle. On the other hand, sometimes no suitable practitioner will be available until several days later than the start date of an open seat. Further, on any given day, many practitioners with different skills and location preferences conceivably are available for assignment, while new open seats with requirements for more people will initiate with needs for a varied mix of skills, work location, etc., that may or may not coincide well with the available practitioners. Thus, in many cases something even approaching a perfect match is simply not possible, resulting in both unassigned practitioners and open seats that are "due" but have not yet been staffed.

Generally, the cumulative number of days when open seats are not staffed on time can be termed called "overdues", and the dynamic pool of unassigned practitioners 112 (i.e., the resource pool from which available practitioners can be drawn) can be termed the "bench". Having a large number of overdues implies lost revenue opportunities, and a large bench over a period of time can represent a large, reduceable cost. Too small of a bench may also be undesirable, since it might leave a company unable to respond to sudden spurts in demand (e.g., where many open seats might be due at once). Thus, a key goal of efficient resource allocation is often the effective management of a bench while minimizing the number of overdues.

Typically, "resource management units" (RMU's) can be responsible for tracking the bench size, overdues, on-time fill rates and other metrics to develop optimal allocations of resources. In order to do this effectively, RMU's may rely heavily on underlying information (data) for both demand and supply. For example, knowledge of demand-related information such as project openings, start dates, end dates, skills required, location, etc., and supply-related information such as practitioners' resumes, skill sets, experience levels and personal preferences is virtually essential before any assignment decisions can be made. On a smaller scale this might be manageable, but in large IT services companies with thousands of practitioners and several thousand open seats on any given day, decision makers will typically operate with at best limited visibility into organization-wide parameters (e.g., supply and demand of skills, practitioners, open seats). Consequently, to the extent that conventional tools currently available to decision makers typically do not provide effective global perspectives, each decision maker tends to make "local" decisions based on such limited information, e.g., by proposing a "best" available candidate for a given open seat, irrespective of whether that candidate is ideal or even necessary for that seat or not. Over time, such local decisions can lead to problems such as a large bench largely composed of inexperienced practitioners whose skills do not match the skills demanded by currently open seats. The lack of an organization-wide "bird's eye" perspective also impacts efficiency because, in the absence of initial clarity regarding which open seats are best suited for each practitioner, too many practitioners might be accorded consideration during the assignment process when such might not be warranted. This lack of shared perspective, at times, can also lead to conflicts between different decision-makers who would want to choose the same practitioner for their respective open seats. Put another way, decision makers can be understood as generally being required to make decisions in the best interest of an organizations. However, due to a local perspective or even bias, each decision maker can generally only try to pick the best candidate for an open seat, and some candidates may be the best choice for more than one seat due to their skills. So, in a situation when two decision makers both want the same practitioner for their open seat, it can be appreciated that if a tool were available to provide a shared perspective to determine which choice will serve the organization better, the decision makers can resolve the conflict easily, and decide amongst themselves who gets to pick the practitioner.

Figure 3:
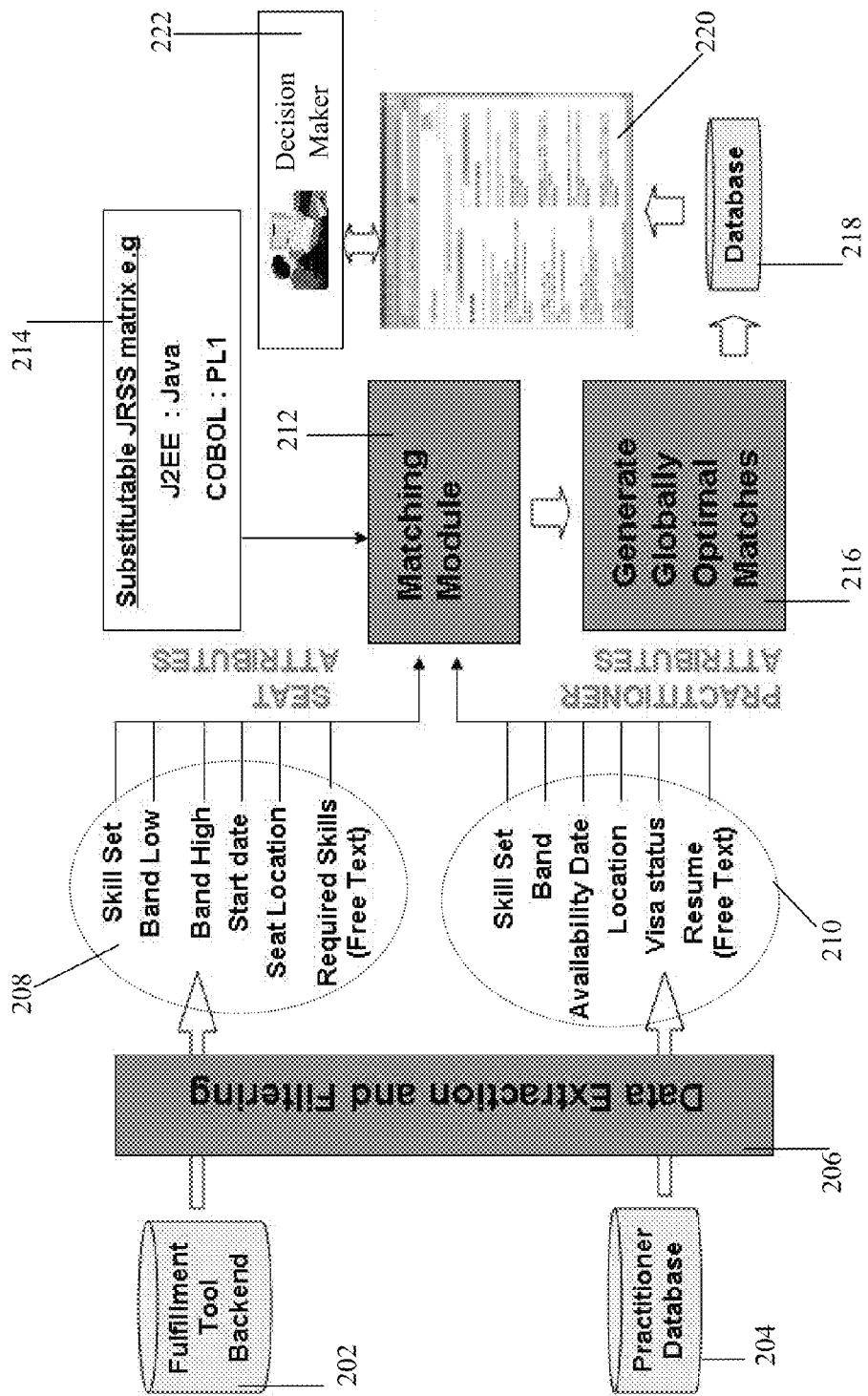
FIG. 3 schematically illustrates a decision support tool and user interface.

The disclosure now turns to a discussion of a decision support tool in accordance with a presently preferred embodiment of the present invention. Particularly, and with reference to FIG. 3, addressed here below are the components of a decision support tool and the unique function of each of some different but interconnected modules.

Generally, for any effective decision support system, one can envision a three-layer architecture. The foundation is the Data Layer (202/204/206) where the data is prepared for subsequent operations. Various data cleaning and filtering operations take place in this layer. Data is preferably drawn from a fulfillment tool backend 202 (with open seat data) and a practitioner database 204. Further, preferably not all practitioners and open seats are considered for matching. Consideration here may be limited to those open seats which are due in the next N days (typically, N=30 or N=60), as the requirements and start dates are more volatile for seats that are due farther in the future. After data extraction and filtering (206), then, seat attributes 208 and practitioner attributes 210 are preferably passed on to the Business Logic Layer (212/216).

Preferably, one important component in the Business Logic Layer is the Matching Module 212 (discussed in more detail here below), which generates feasible matches between project openings and practitioners from the unstructured text such as resume, project descriptions, preferences, etc. These feasible matches are fed preferably as the input to an optimization module 216 where globally optimal assignments are made using an integer programming approach optimizing some key business metrics (further details thereof are discussed here below). Recommendations from the optimization module 216 are preferably consumed by the end user in an accessible manner. Hence, it is expedient to use a Presentation Layer (218/220/222) to maximize the impact and increase adoption of such tools by the end user. As such, a user interface (UI) preferably draws from a database 218 information that has been input by the optimization module 216. The UI 220 is preferably configured to permit decision-makers 222, with information support, to make faster and optimal decisions (as discussed in further detail here below).

The matching module 212 preferably generates matches (with fitness scores) of practitioners to open seats. Often, some crucial and informative data on both demand and supply is present in the form of unstructured text. For practitioners, resumes will preferably contain a description of their skills and experience, and organizations might additionally have records of their skills and expertise levels as assessed by other senior colleagues (e.g., managers). For open seats, the skill requirements are often specified as free text.

A text matching component in the matching module 212 preferably performs a matching of the text fields of each open seat with the text fields of each of the practitioners and generates a score for that pair. The algorithm for matching can be based on essentially any commonly used vector space model. In such a model, the whole set of terms is preferably considered to form a vector space, each dimension corresponding to one term. Any piece of text is considered as a vector in that vector space, the importance of each term in the text determining the weight of that term (the corresponding entry in the vector), according to any standard term weighting function.

The similarity of two pieces of text can preferably be generally computed by the cosine or the dot product between the two corresponding vectors. In an exemplary application, the two pieces of text correspond to the open seat text fields on one hand and the practitioner text fields on the other hand. When used by a search engine, the query is used as one vector and the documents are ranked based on their similarity with the query. The top ranked documents are returned as the search results. In other words, the top results are those which have more important terms common with the query.

The text matching engine can employ essentially any suitable search engine, such as a Lucene engine (itself an open source search engine which also offers an API), to index all the practitioners' data. The index is preferably regularly updated as the practitioners update their data in the system. For every seat, the text fields are extracted from the database and a search query (such as a Lucene search query) can preferably be formed by removing stopwords (e.g., unimportant and common words, such as 'and', 'the', 'about'), and boosting key terms indicating important skills. The search engine is then preferably employed to compute the cosine similarity between practitioner and seat data for each seat-practitioner pair. The pairs with scores below an experimentally tuned threshold are preferably discarded; it will be appreciated that such a threshold can be valuable in controlling noise from the text matching process.

When skills are specified from a Skills Ontology, it might be expedient not to enforce an exact match on such canonical skills. Thus, one can consider "substitutable" skills that apply when finding matches. For any given open seat, with a specified skill set, there are some neighboring (or secondary) skill sets; preferably the frequencies of such cross-skills matches are determined from historical data, with appropriate thresholds, and a matrix of substitutability of skills is formed (214). Likewise, in addition to a primary skill set, a practitioner might also have secondary skill sets. Thus, this results in getting many more matches without a serious compromise on the quality of the matches.

Only practitioners whose tier and skills match those required by an open seat are preferably considered. The skills are matched based on a specification of a set of skills from a skills ontology for both supply (practitioners) and demand (open seats), and also based on unstructured information about skills for both supply (resumes of practitioners) and demand (textual description of open seat requirements). Based on all the above constraints, a set of feasible matches, with compatibility scores computed for each match (for unstructured attributes), is preferably generated for each open seat and passed to the optimization module 216).

Preferably, optimization module 216 will take the set of feasible matches, generated by the matching module, as input. The feasible matches already come with compatibility scores based on unstructured fields. For the structured parameters (such as location, sector, tier, etc.) the optimization module preferably assigns a high compatibility score when the values of demand and supply match exactly, and a lower score (which can also be zero, depending on the business logic) if the values do not match exactly.

In addition to the static attributes, a business rule can preferably be incorporated into the model which implies that a seat (practitioner, respectively) that is overdue (on bench, resp.) for a longer time needs to get preference over seats (practitioners, resp.) that are not overdue or overdue for a shorter time (not on bench, or on bench for a shorter time, resp.). This can be imbued into the model by introducing a reward/penalty function (that is calculated according to the relevant business rules) corresponding to any specific match.

Given the above scenario, the business problem is to optimize the allocation of practitioners to open seats by picking out those feasible matches as per the preferences specified by the organization and deployment managers to meet the global business objectives. This business problem can be formulated as a matching problem, modeling it as an Integer Program (IP), with the parameters shown here below:

S: Set of all seats, indexed using s
P: Set of all practitioners, indexed using p
$P_s$: Set of relevant practitioners for a given seat s
$S_p$: Set of relevant seats for a practitioner p
G: Bipartite graph G:(V,E) where V:S∪P and E:Set of feasible matches (s,p)
$O_s$: Number of open positions for seat s
$L^s_p$: Penalty/Reward associated with a (s,p) pair
$C^s_p$: Weighted combination of text matching score and criteria such as location, sector and tier, for a (s,p) pair The parameters $C^s_p$ and $L^s_p$ are derived from the combination of some other parameters to simplify the representation. $C^s_p$ represents the compatibility of a match and is derived from a weighted combination of the text matching scores along with other relevant criteria such as location, sector and tier match. These are some of the business specific rules that can be easily customized. On the other hand $L^s_p$ defines reward/penalty given to a practitioner seat (p,s) pair, giving higher preference for seats which are long overdue and practitioners who are on bench for a long time. A negative value (reward) is given to $L^s_p$ for the pair where both seat and practitioner are overdue and on bench respectively followed by positive values (penalty) to a pair which has either seat or practitioner starting in future.

In the integer Programming (IP) formulation, the IP is preferably formulated with the following decision variables:

$x^s_p$=1 if seat s is assigned to practitioner p, 0 otherwise
$u_p$=1 if practitioner p is available, 0 otherwise
$w_s$=1 if seat s is available, 0 otherwise The objective of the problem is to maximize a utility function, which is a linear combination of the total assignment score and total penalty. Thus, the IP can be formulated as follows.

Maximize utility function $$U = W_0 \sum_{Ve \in \varepsilon} x^s_p + W_1 \sum_{Ve \in \varepsilon} C^s_p x^s_p - W_2 \sum_{Ve \in \varepsilon} L^s_p x^s_p$$

subject to constraint (C1):

$$\sum_{Ve:(s,p), s \in S_p} x^s_p \leq u_p \quad V_{p \in P}$$

and constraint (C2):

$$\sum_{Ve:(s,p), p \in P_s} x_p \leq O_s w_s \quad Vs \in S$$

The first term in U ensures that we have enough matches (potentially increasing the fill rate and reducing the bench and number of overdue seats). The second one ensures that high quality matches are picked. The third term ensures that practitioners on bench and overdue seats get higher priority than practitioners or seats active only in the future. This is desirable for avoiding starvation in the resource pool and minimizes the bench time or overdue of the seat being assigned. These three objectives can be weighted according to their relative importance as predefined by backend users (e.g., business managers).

The underlying problem is a classical bipartite matching problem that effectively maximizes the total score and minimizes the penalty. Constraint (C1) implies that a practitioner can be assigned to one seat only. This is required to avoid conflicts while proposing practitioners for a particular seat which in turn will reduce the overheads and lead time for assignment decisions. Constraint (C2) states that a seat may get at most as many practitioners as the number of positions present.

In practice, decision-makers normally want not just a single match but a set of potentially good matches. Also, they want a rank ordering among those matches that will facilitate them in making faster decisions. However, it is not desirable to have the same (practitioner, seat) combination appear in such different matches. Thus, to propose such a "non-overlapping" solution, with a unified objective, one can re-iterate the matching logic by re-solving the instance, after removing the matches found in previous iterations, from the set of remaining feasible matches. Iterations give ranked solutions as each rank solution corresponds to a different objective function value. The rank 1 solution corresponds to the best globally optimal solution, and lower rank solutions come with a business impact reflected by the degradation in objective function value. The ranked matches produced by the optimization module are stored in a database and displayed to the users via a web-based user interface (UI) which we describe in the next section.

Since the process of workforce management essentially involves several levels of human interaction, the system will preferably include a viable user interface (UI). Preferably, a UI may be imbued with three primary roles, namely user, administrator and developer, with three levels of privileges. Also, the UI has been designed to satisfy the following essential properties, namely (1) Ease of use, (2) Comprehensibility and (3) Fast response, and it also helps in governance.

FIG. 4 provides a screenshot of a UI 302 in accordance with a presently preferred embodiment of the present invention. Shown are matched practitioners 304/306 or a seat 303. The system can preferably also provide a similar (inverted) view for showing matched seats for every practitioner.

Preferably, the UI provides an easy navigation with a simple flow. The first page can allow the user to choose a view showing the seats (or practitioners) corresponding to any of the relevant categories, such as deployment manager, sector or competency. In that page, a link below, every seat (practitioner, resp.) takes the user to another page showing the matches found for that seat (practitioner).

The UI 302 can preferably be evolved through several iterations and experimental phases during which direct (via personal discussion) and indirect (analyzing usage logs) feedback from the users and business owners are collected to determine the important pieces of information to be displayed with proper highlighting, and finally reached a state where it displays most of the relevant information to the users without being overwhelming. The matching skills in the form of search-result like snippets, whether a seat (practitioner) is overdue (idle for a long time), the finer analysis of matching and mismatching attributes between a matched pair of seat and practitioner are a few that are highlighted.

Due to global optimization, the system often comes up with ranked list of matches where a match ranked lower in the list is visibly a better match than one ranked higher if judged only locally for one particular seat or practitioner. While it is a challenging task to influence individual users to accept the more globally optimal matches in such cases, the UI 302 can preferably make a sincere effort to explain the reason of the matches in the global scenario, as much as possible. For example, beside basic information (308) of a practitioner matched to a seat, the number of seats matched to that practitioner can be displayed as "cross matches" 309 to indicate the global demand for that practitioner (and vice versa for the seats matched to practitioners). If some seat (practitioner) is already proposed for some practitioner (seat), then that information also is displayed.

The user interface preferably displays results and information stored in several database tables, storing the data for about 4,000 seats and about 40,000 practitioners, and 60,000 matches computed offline. (These numbers are indicative of the size of the data, which changes daily.) For a good user experience, a reasonably fast response time of within 1 second, on average, can be ensured by performing optimized batch accesses to the database whenever multiple records needed to be accessed, and by precomputing some important flags which were required for filtering.

The decision support tool preferably helps stakeholders such as project managers, peers and senior management by providing a comparative analysis of various decision alternatives. It brings in a much higher level of transparency, into an otherwise opaque decision making process. It also helps resolve conflict between two decision-makers who might both want the same practitioner for their respective seats.

The disclosure now turns to a discussion of the performance of a decision support tool such as that discussed above, and compares it with the simulated scenarios which potentially resemble the decision process prior to this decision support tool. Although it is very difficult to simulate the real world decision making process due to complexities arising from different human behavior. One can make certain assumptions about the behavior purely for the purpose of comparison. For example one such assumption is all decision makers are rational and possess similar information about an assignment, i.e., utility perceived by each decision maker is same for a match along with what all are the feasible set of matches for a given open seat. It is possible that decision-makers do not have information of all the possible open demand and supply. It is the global picture which is missing from each decision-maker due to which they try to maximize their local objectives which sometimes are not aligned with global business objectives. The section presents various scenarios one can imagine a decision-maker is likely to fall in and simulate it to capture the variability in the decision making process. Later it compares the overall performance of decision-makers with and without this support system. The three business metrics driving the optimization are overall utility, total matches and bench size/number of overdue seats which are used as benchmark performance metrics for these experiments. We first explain the three possible scenarios one can relate with any existing decision making process in services delivery.

The first scenario is greedy Assignment by global RDM (GA). Consider the situation where decision-maker has perfect visibility over all seats and practitioners and (s)he assigns the seats so as to maximize the utility. The greedy approach would be to pick the matches first which has the highest utility without considering the impact to total number of matches. For example, there may be two open seats $s_1$ and $s_2$ and two practitioners $p_1$ and $p_2$. Consider a situation where Utility $U(s_1 p_1)$ is maximum and $p_2$ is feasible for only $s_1$. Also $p_1$ is feasible for both $s_1$ and $s_2$. Greedy algorithm will pick $(s_1 p_1)$ pair keeping $s_2$ overdue and $p_2$ on bench which sometimes is not an optimal decision to make. Although this approach will maximize the utility per match reflected in the results but using simple arguments, it can be shown that due to lack of maximal substructure property, this approach won't necessarily give the optimal solution. This is a more deterministic setting where there is only one decision maker with complete information of the system and no variability in decisions are expected. Such an assumption might be true for small-scale organizations where overheads are low.

The next scenario is the utility-based assignment of seats (UA). Most of the times decision-makers face the situation where they hold some overdue seats and some resources on bench to be matched. Due to this, decision-maker is likely to assign seats which are overdue for long first and later consider seats which are expected to come in future and similarly for the practitioners. For such a seat picked, out of all the feasible matches, the likelihood of it getting a suitable match is governed by the utility of the seat practitioner pair. The higher the score is, greater is the probability of the corresponding seat-practitioner assignment. Hence assignments are made based on such a utility-based probability distribution. After each assignment posterior probabilities are calculated and further assignments are made from posterior distribution till all the open positions are filled for the seat picked. For the simulation purpose we assume seats are picked in the ascending order of their start dates, i.e., seat which is overdue longest is picked first for the assignment. One can expect some variability on performance due to ordering of seats being picked, but such an ordering as discussed above is more likely to happen in such delivery settings.

Finally, the third scenario is random Assignments (RA). Similar to the above design, this scenario picks the assignments randomly from a uniform distribution. All the seat practitioner pair are equally likely to be picked first. This scenario will resemble to the system when there is not enough information to make global decisions and everyone is trying to make decisions simultaneously. As shown in the results, one can expect much larger variability in the outcomes. Such a design is purely from a theoretical interest to see how much improvement any tool will make if decisions were made in complete random manner without any business objective. Alternatively, one can realize the value of the design of business objective for this process.

By way of analysis, all the above three scenarios were simulated for ~100 iterations, and performance is compared on the three business metrics, i.e., Total utility, total assignments and bench size reduction on day 1 post assignments. Since decision-making via optimized solution or GA approach are deterministic we don't see any variability in the final outcome during any of the iterations. For the other two simulations, we plot a 95% confidence interval along with the mean generated for all the three-business metrics and compare it with rank 1 optimal solution.

Figure 5:
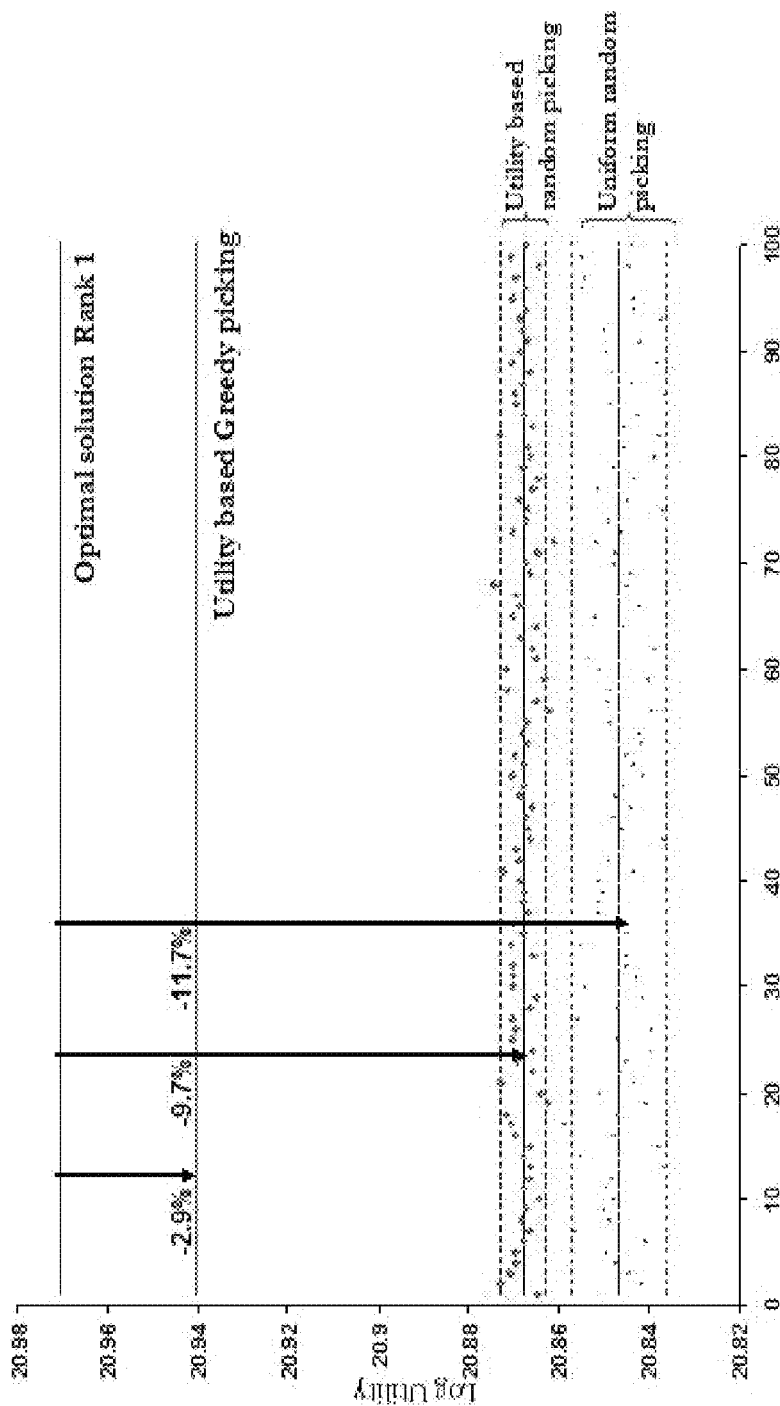
FIGS. 5 and 6 graphically illustrate experimental results comparing different resource allocation methods.
Figure 6:
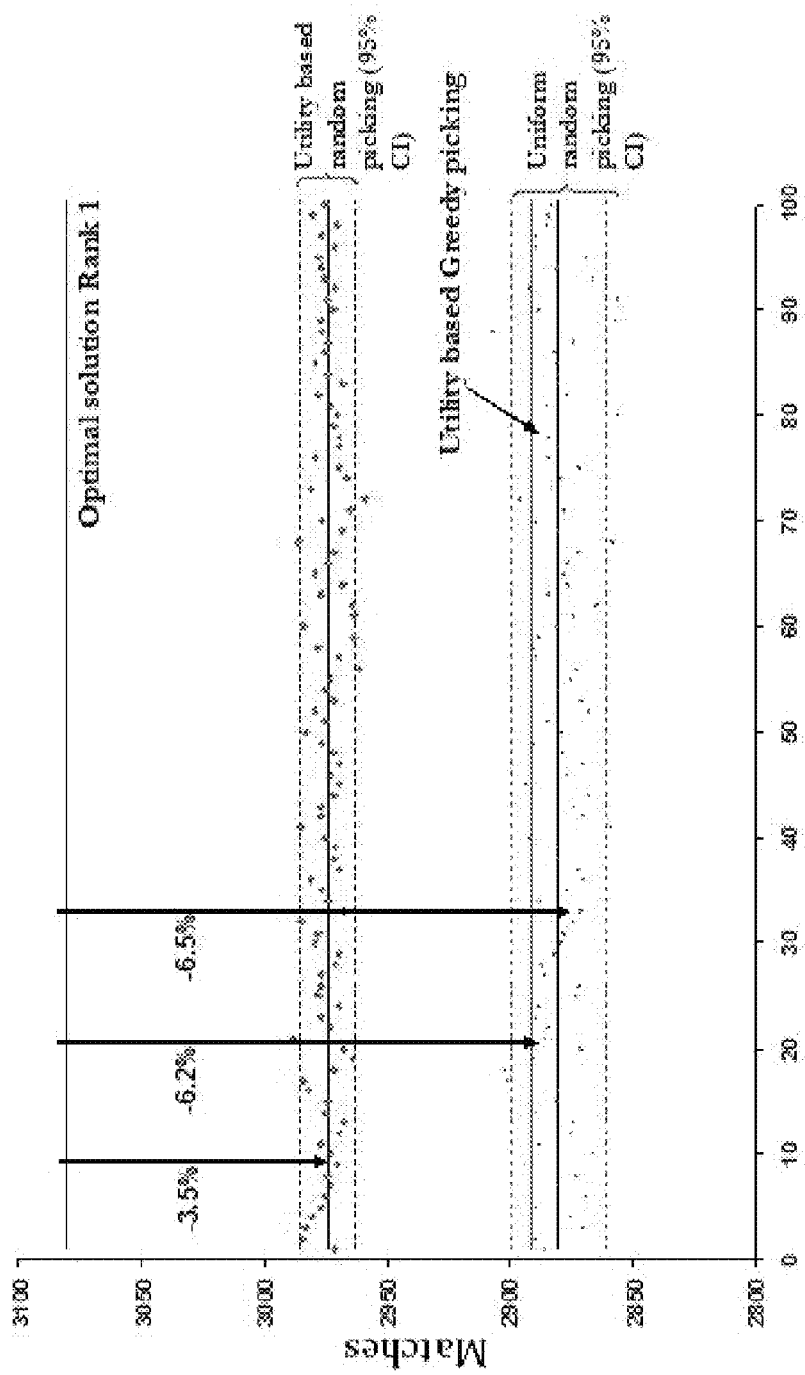
Figure 7:
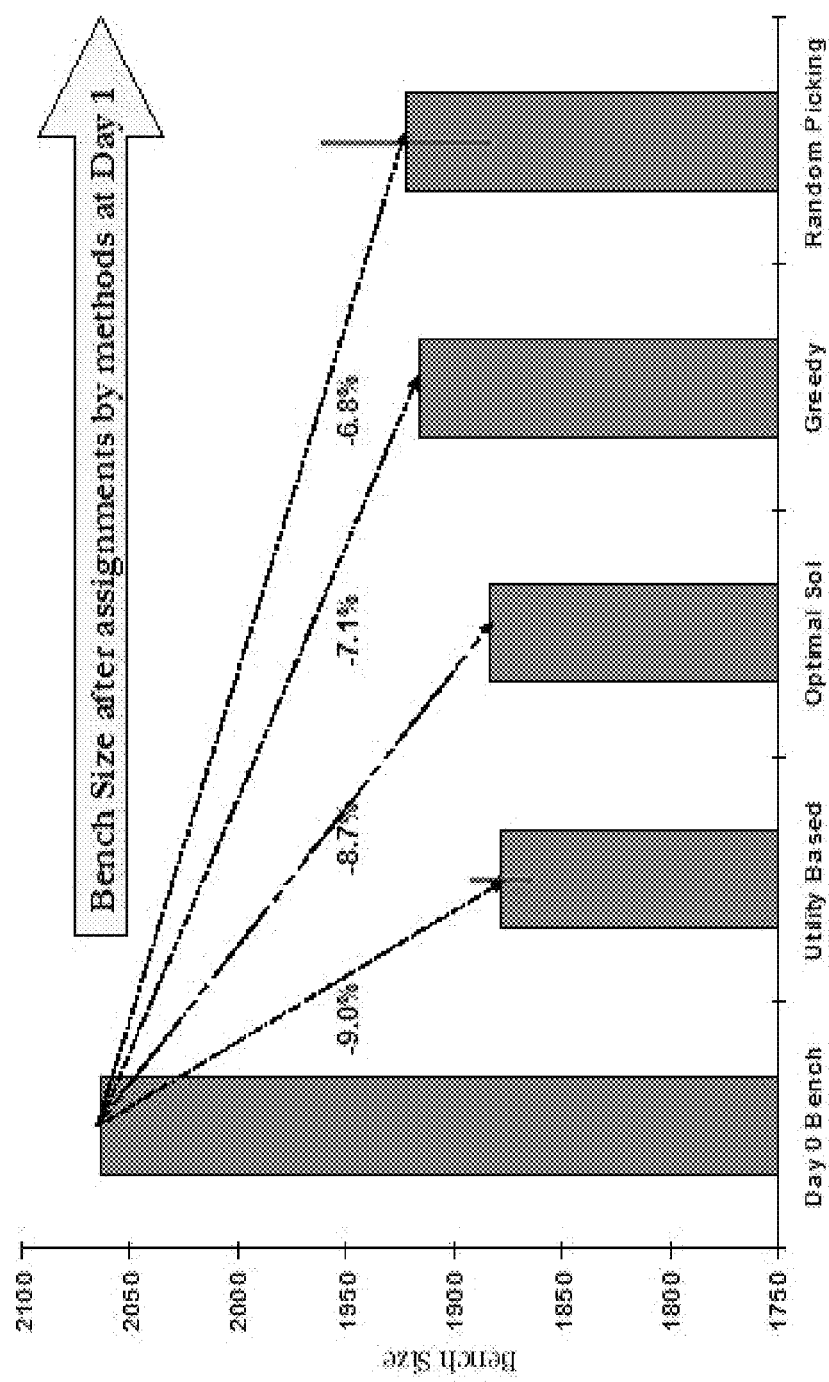
FIG. 7 graphically illustrates bench size reduction as compared for different resource allocation methods.

Utility value was expected to be maximum for the optimized solution. As we moved from the optimal solution, it is interesting to see all the other decision-making processes show a significant degradation in the objective value. The degradation in utility was about 3%, 10% and 12% as we moved from intelligent assignment to GA, UA and RA respectively (FIG. 5). The optimized solution also happens to maximize the number of matches since the objective was designed to maximize fill rate. The corresponding reduction in the number of matches by GA, UA and RA were about 6%, 4% and 7% respectively. The bench size reduction was slightly more in case of UA. This may be attributed to the fact we see high matches in UA compared to GA and RA approaches. FIG. 7 shows bench reduction only for day 1 where as one can expect optimized solution will give a higher bench reduction over a period of time since number of matches are much higher from optimal solution (FIG. 6). It is evident from the results that a direct cost savings can be made via such tools. This comparison strengthens our belief that this support system will help in improving the business metrics bringing direct cost benefits along with the improvement in productivity of decision-makers by enabling faster and optimal decisions.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A system comprising:
    a decision support tool comprising one or more processors and one or more modules executable by the one or more processors, the one or more modules comprising:
    computer code configured to assimilate open seat data and practitioner data;
    computer code configured to transform the open seat data and practitioner data into seat attributes and practitioner attributes;
    computer code configured to assess viability of matching practitioners with seats based on predetermined matching criteria, and to thereupon determine feasible matches;
    computer code configured to determine preferred matches via integer programming and via employing the feasible matches as input, and further via:
        maximizing a utility function which employs a weighted summation of a number of already-assigned seats, a weighted summation of compatibility scores and a weighted summation of reward/penalty scores;
        each compatibility score relating to a matching of a practitioner-seat pair, and being derived from a weighted combination of at least one matching score and at least one other criterion;
        each reward/penalty score relating to a time factor with respect to a practitioner-seat pair;
        wherein a reward is applied to at least one of: an overdue seat, and a practitioner remaining unassigned for a period of time;
        wherein a penalty is applied to at least one of a seat and a practitioner being scheduled for implementation in the future;
        applying a first constraint to the utility function, the first constraint ensuring that a practitioner can be assigned to one seat only;
        applying a second constraint to the utility function, the second constraint ensuring that a seat is assigned, at most, as many practitioners as the number of open positions for the seat; and
    computer code configured to deliver the preferred matches to a user interface.

2. The system according to claim 1, wherein the one or more modules further comprise computer code configured for assessing viability of matching practitioners with seats based on fitness scores, wherein the compatibility score is based on at least one fitness score.

3. The system according to claim 2, wherein the one or more modules further comprise computer code configured for assessing viability of matching practitioners with seats based on text matching, the text matching contributing to the fitness scores.

4. The system according to claim 3, wherein the text matching comprises comparing text related to practitioners and seats, respectively, and yielding a result corresponding to a degree of text matching.

5. The system according to claim 4, wherein the text matching further comprises comparing text related to distinct categories relating to practitioners and seats, and assigning a comparative weight to each category.

6. The system according to claim 3, further comprising computer code configured for employing a substitutability matrix, the substitutability matrix indicating prescribed equivalencies between pairs of differing text vectors.

7. The system according to claim 2, further comprising computer code configured for assigning a lower threshold for fitness scores and discarding results not meeting the lower threshold.

8. The system according to claim 1, wherein the one or more modules further comprise computer code configured for determining preferred matches via optimization of business metrics.

9. The system according to claim 8, wherein the seat attributes include a prescribed timescale for effecting a match, and the business metrics are configured to employ the reward/penalty score to assert a preference for overdue seats with respect to the prescribed timescale.

10. The system according to claim 1, comprising:
    computer code configured to display at least one optimal match corresponding to a practitioner and a seat and, adjacent thereto, cross-match information corresponding to at least one other viable seat corresponding to a practitioner.

11. The system according to claim 10, the one or more modules further comprising computer code configured to display, based on a fitness score rank, matches corresponding to a plurality of practitioners and seats.

12. The system according to claim 1, wherein the compatibility score is modified from an initial compatibility score associated with the feasible matches, the initial compatibility score relating to at least one unstructured attribute.

13. A method comprising:
    executing with one or more processors the steps of:
    assimilating open seat data and practitioner data;
    transforming the open seat data and practitioner data into seat attributes and practitioner attributes;
    assessing viability of matching practitioners with seats based on predetermined matching criteria, and thereupon determining feasible matches;
    determining preferred matches via integer programming and via employing the feasible matches as input;
    said determining comprising:
        maximizing a utility function which employs a weighted summation of a number of already-assigned seats, a weighted summation of compatibility scores and a weighted summation of reward/penalty scores;
        each compatibility score relating to a matching of a practitioner-seat pair, and being derived from a weighted combination of at least one matching score and at least one other criterion;

each reward/penalty score relating to a time factor with respect to a practitioner-seat pair;

wherein a reward is applied to at least one of: an overdue seat, and a practitioner remaining unassigned for a period of time;

wherein a penalty is applied to at least one of a seat and a practitioner being scheduled for implementation in the future;

applying a first constraint to the utility function, the first constraint ensuring that a practitioner can be assigned to one seat only;

applying a second constraint to the utility function, the second constraint ensuring that a seat is assigned, at most, as many practitioners as the number of open positions for the seat; and delivering the preferred matches to a user interface.

14. The method according to claim 13, wherein said assessing comprises assessing viability based on fitness scores, wherein the compatibility score is based on at least one fitness score.

15. The method according to claim 14, wherein said assessing based on fitness scores comprises text matching.

16. The method according to claim 15, wherein said text matching comprises comparing text related to practitioners and seats, respectively, and yielding a result corresponding to a degree of text matching.

17. The method according to claim 16, wherein said text matching further comprises comparing text related to distinct categories relating to practitioners and seats, and assigning a comparative weight to each category.

18. The method according to claim 15, further comprising computer code configured for employing a substitutability matrix, the substitutability matrix indicating prescribed equivalencies between pairs of differing text vectors.

19. The method according to claim 14, further comprising assigning a lower threshold for fitness scores and discarding results not meeting the lower threshold.

20. The method according to claim 13, wherein said determining further comprises determining preferred matches via optimization of business metrics.

21. The method according to claim 20, wherein the seat attributes include a prescribed timescale for effecting a match, and the business metrics are configured to employ the reward/penalty score to assert a preference for overdue seats with respect to the prescribed timescale.

22. The method according to claim 13, comprising:
displaying at least one optimal match corresponding to a practitioner and a seat and, adjacent thereto, cross-match information corresponding to at least one other viable seat corresponding to a practitioner.

23. The method according to claim 22, wherein said displaying comprises displaying, based on a fitness score rank, matches corresponding to a plurality of practitioners and seats.

24. The method according to claim 13, wherein the compatibility score is modified from an initial compatibility score associated with the feasible matches, the initial compatibility score relating to at least one unstructured attribute.

25. A computer program product comprising:
a non-transitory computer readable storage medium having computer readable program code embodied therewith, the computer readable program code comprising:
computer code configured to assimilate open seat data and practitioner data;
computer code configured to transform the open seat data and practitioner data into seat attributes and practitioner attributes;
computer code configured to assess viability of matching practitioners with seats based on predetermined matching criteria, and to thereupon determine feasible matches;
computer code configured to determine preferred matches via integer programming and via employing the feasible matches as input, and further via:
maximizing a utility function which employs a weighted summation of a number of already-assigned seats, a weighted summation of compatibility scores and a weighted summation of reward/penalty scores;
each compatibility score relating to a matching of a practitioner-seat pair, and being derived from a weighted combination of at least one matching score and at least one other criterion;
each reward/penalty score relating to a time factor with respect to a practitioner-seat pair;
wherein a reward is applied to at least one of: an overdue seat, and a practitioner remaining unassigned for a period of time;
wherein a penalty is applied to at least one of a seat and a practitioner being scheduled for implementation in the future;
applying a first constraint to the utility function, the first constraint ensuring that a practitioner can be assigned to one seat only;
applying a second constraint to the utility function, the second constraint ensuring that a seat is assigned, at most, as many practitioners as the number of open positions for the seat; and
computer code configured to deliver the preferred matches to a user interface.

* * * * *